(12) United States Patent
Skinner

(10) Patent No.: US 12,130,595 B2
(45) Date of Patent: Oct. 29, 2024

(54) SYSTEM AND METHODS FOR AUTOMATED AND MODULAR CONTROLLED-ENVIRONMENT AGRICULTURE UNITS

(71) Applicant: CommonTech Corp, Tucson, AZ (US)

(72) Inventor: Mark Edward Skinner, Tucson, AZ (US)

( * ) Notice: Subject to any disclaimer, the term of this patent is extended or adjusted under 35 U.S.C. 154(b) by 267 days.

(21) Appl. No.: 17/568,735

(22) Filed: Jan. 5, 2022

(65) Prior Publication Data
US 2023/0213894 A1 Jul. 6, 2023

(51) Int. Cl.
| A01G 9/14 | (2006.01) |
| A01G 7/00 | (2006.01) |
| A01G 31/00 | (2018.01) |
| G05B 13/02 | (2006.01) |

(52) U.S. Cl.
CPC ........... *G05B 13/0265* (2013.01); *A01G 9/14* (2013.01); *A01G 31/00* (2013.01); *A01G 7/00* (2013.01)

(58) Field of Classification Search
USPC ........... 47/58.1 R, 79, 60, 63, 62 R, 17, 66.7
See application file for complete search history.

(56) References Cited

U.S. PATENT DOCUMENTS

| RE31,023 E | * | 9/1982 | Hall, III | ............ A01G 7/00 193/25 E |
| 5,566,069 A | * | 10/1996 | Clark, Jr. | ............ H04L 67/12 702/2 |
| 10,306,847 B2 | | 6/2019 | Whitcher et al. | |
| 10,524,433 B2 | | 1/2020 | Spiro | |
| 10,548,268 B1 | | 2/2020 | Lu | |
| 2017/0127622 A1 | | 5/2017 | Hong | |
| 2017/0325427 A1 | * | 11/2017 | Straight | ............ A01K 63/065 |
| 2018/0262571 A1 | | 9/2018 | Akhtar | |
| 2018/0359945 A1 | * | 12/2018 | Millar | ............ A01G 9/20 |

(Continued)

FOREIGN PATENT DOCUMENTS

| GB | 2483467 | * | 3/2012 | ............ A01G 9/16 |
| WO | WO 2016/164652 | * | 10/2016 | ............ A01G 7/04 |

OTHER PUBLICATIONS

Chowdhury, M. et al., Design, Construction and Testing of IoT Based Automated Indoor Vertical Hydroponics Farming Test-Bed in Qatar. Sensors, 20(19), 5637. doi:10.3390/s20195637.

(Continued)

*Primary Examiner* — Andrea M Valenti
(74) *Attorney, Agent, or Firm* — Stevens Patent Law; James Stevens

(57) ABSTRACT

Accordingly, the inventor has conceived and reduced to practice, a system and method of farming using a computer controlled micro-environment suitable for soil-based and soilless growing media that is sustainable and totally automated from seed to harvest. The system utilizes software, sensor networks, and computing hardware that monitors and alters the environment in the growing units and provides nutrients, water, lighting, air flow, and temperature control specific to the crop being cultivated in one or a combination of vertical assemblies of growing units with electronically controlled features. Each unit is enabled to independently seed, cultivate, and produce a mature crop and discharge the contents for further processing for the intended market.

6 Claims, 17 Drawing Sheets

(56) References Cited

U.S. PATENT DOCUMENTS

| | | | |
|---|---|---|---|
| 2018/0364987 A1* | 12/2018 | Millar | A01G 31/02 |
| 2021/0068334 A1 | 3/2021 | Mutahi et al. | |
| 2021/0251161 A1* | 8/2021 | Croteau | A01G 9/18 |
| 2022/0007589 A1* | 1/2022 | Binney | G06T 7/0012 |
| 2023/0024142 A1* | 1/2023 | Sobrado Pauly | A01G 31/00 |
| 2023/0073964 A1* | 3/2023 | Hertel | A01G 31/06 |

OTHER PUBLICATIONS

Jaiswal, H. et al, IoT and Machine Learning based approach for Fully Automated Greenhouse. 2019 IEEE Bombay Section Signature Conference (IBSSC) (pp. 1-6). Mumbai, India: IEEE. doi:10.1109/IBSSC47189.2019.8973086.

Krishnan, A., Robotics, IoT, and AI in the Automation of Agricultural Industry: A Review. 2020 IEEE Bangalore Humanitarian Technology Conference (B-HTC) Bangalore Humanitarian Technology Conference (B-HTC). Vijiyapur, India: IEEE. doi:10.1109/B-HTC50970.2020.9297856.

Merin, J., Automated Greenhouse Vertical Farming With Wind and Solar Hybrid Power System. 2019 IEEE 11th International Conference on Humanoid, Nanotechnology, Information Technology, Communication and Control, Environment, and Management ( HNICEM ). Laoag, Philippines: IEEE. doi:10.1109/HNICEM48295.2019.9072901.

* cited by examiner

SYSTEM AND METHODS FOR AUTOMATED AND MODULAR CONTROLLED-ENVIRONMENT AGRICULTURE UNITS

CROSS-REFERENCE TO RELATED APPLICATIONS

None.

BACKGROUND

Field of the Art

The disclosure relates to the field of automated agriculture and, more particularly, to the field of digitally controlled modular and multi-configurable growing units.

Discussion of the State of the Art

Current automation solutions for crop cultivation typically handle one or two processes of the cultivation process, but there are several more to be considered to reach a fully automated system. This is because it is, not a trivial thing to fully automate crop cultivation from seed to harvest. The primary goal of current farm automation technology is to cover easier, mundane, and compartmentalized tasks. Take for instance, the fact that there are autonomous tractors, seeders, and harvest robots, but that there is no system that currently exists that performs the functions of even two of those automated technologies, let alone all three. Moreover, large-scale farming typically involves only certain processes to monitor crop and system quality. These systems depend upon getting large crops to the market at a good price to produce profit at the expense of. Changing the crops grown on the land is done several times. Each crop has its own unique needs that require modification of the automation on a large scale. For example, it costs farmers large amounts of capital to condition the soil for each crop rotation. Current industry machines and intelligent automation systems in farming remain compartmentalized and on the industry's fringes. They do not cater to the needs of smaller growers serving smaller, and typically disadvantaged communities.

What is needed is a fully automated, modular and multi-configurable farming system that maximizes crop cultivation within the space available and includes seeding and harvesting mechanisms with full automation capabilities from seed to harvesting in a sustainable manner.

SUMMARY

Accordingly, the inventor has conceived and reduced to practice, a system and method of farming using a computer controlled micro-environment suitable for soil-based and soilless growing media that is sustainable and totally automated from seed to harvest. The system utilizes machine learning software, sensor networks, and computing hardware that monitors the environment in the growing units and provides nutrients, water, lighting, air flow, and temperature control specific to the crop being cultivated in one or a combination of vertical or horizontally configured assemblies of growing units by means of an automated system of electronically controlled features. Each unit is enabled to independently seed, cultivate, and produce a mature crop and discharge the contents for further processing for the intended market.

According to a first preferred embodiment, a system for automated and modular controlled-environment agriculture units is disclosed, comprising: a growing unit equipped with a plurality of dispensers and sensors and communicatively coupled to a network; a supply of a plurality of resources; a plurality of automation equipment, wherein the plurality of automation equipment measures and delivers a supply of water, seeds, nutrients, and soil to the growing unit; and a computer system comprising a memory and a processor operating on the network, wherein a plurality of programming instructions stored in the memory and operating on the processor, causes the computer system to: receive an instruction to begin growing a specific crop; identify the specifications needed to facilitate the specific crop, wherein the specifications are stored in a crop profile and comprise a spatial and nutrient profile of the specific crop; identify a next available growing unit for the specific crop; send a signal to the plurality of automation equipment to measure and deliver the proper amount of soil, nutrients, seeds, and water to the growing unit; monitor the environmental levels within the growing unit; adjust the growing unit's size as applicable based on the crop profile; adjust the environment within the growing unit based on the crop profile and the monitored levels; and exit the specific crop from the growing unit upon detection of crop maturity or crop profile.

According to various aspects; wherein the growing unit expands horizontally and vertically to accommodate the growth of the specific crop; wherein the outer growing unit walls are hollow and comprise inner walls that keep the growing unit self-contained when expanded; wherein the computer system comprises machine learning models to determine the best growing environment for the specific crop within a growing unit; wherein the machine learning models update the crop profile; and wherein the machine learning models use computer vision to monitor crop progression.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
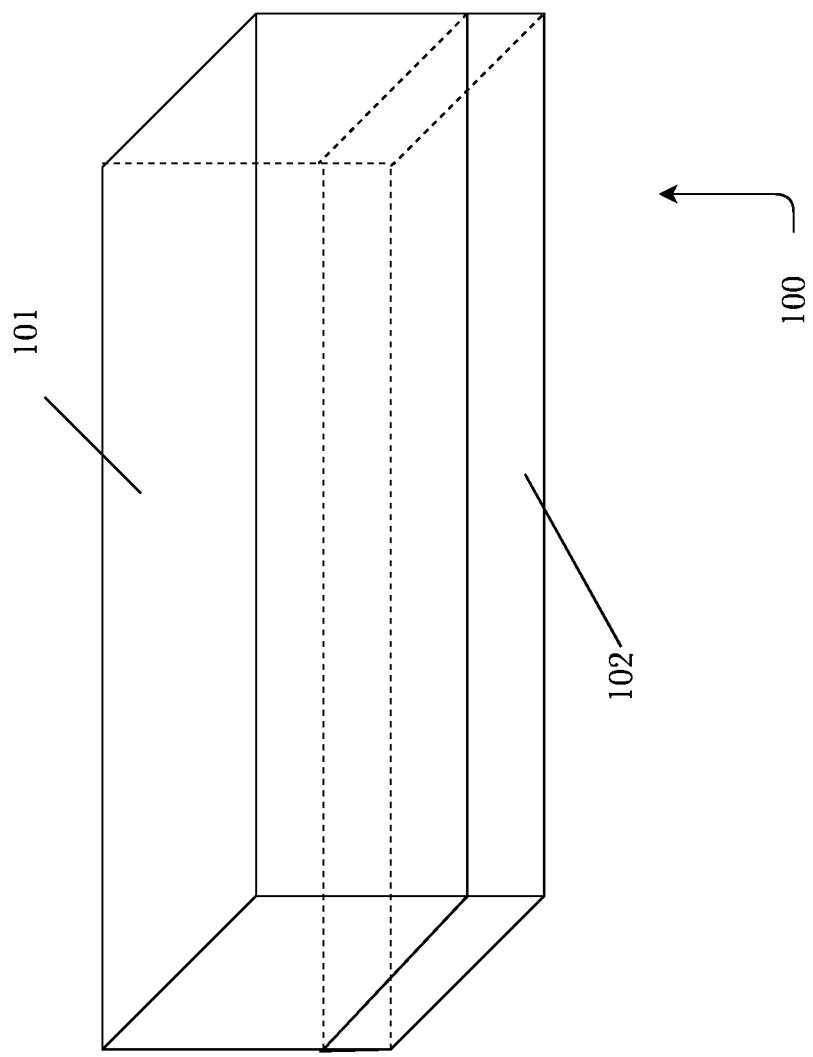
FIG. 1 is exemplary of the upper and lower assemblies of a growing unit without appurtenances as viewed from the front left, according to one embodiment.

Accordingly, the inventor has conceived and reduced to practice, a system and method of farming using a computer controlled micro-environment suitable for soil-based and soilless growing media that is sustainable and totally automated from seed to harvest. The system utilizes software, sensor networks, and computing hardware that monitors the environment in the growing units and provides nutrients, water, lighting, air flow, and temperature control specific to the crop being cultivated in one or a combination of vertical or horizontal assemblies of growing units by means of an automated system of electronically controlled features. Each unit is enabled to independently seed, cultivate, and produce a mature crop and discharge the contents for further processing for the intended market.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "growing unit" as used herein, means an embodiment of the fully automated, sustainable system of modular and multi-configurable growing units.
Detailed Description of Exemplary Embodiments and Aspects FIG. 1 is an embodiment exemplary of the upper 102 and lower 102 assemblies of a growing unit 100 without appurtenances as viewed from the front left. The upper assembly 101 moves relative to the lower assembly 102 which remains fixed.

Figure 2:
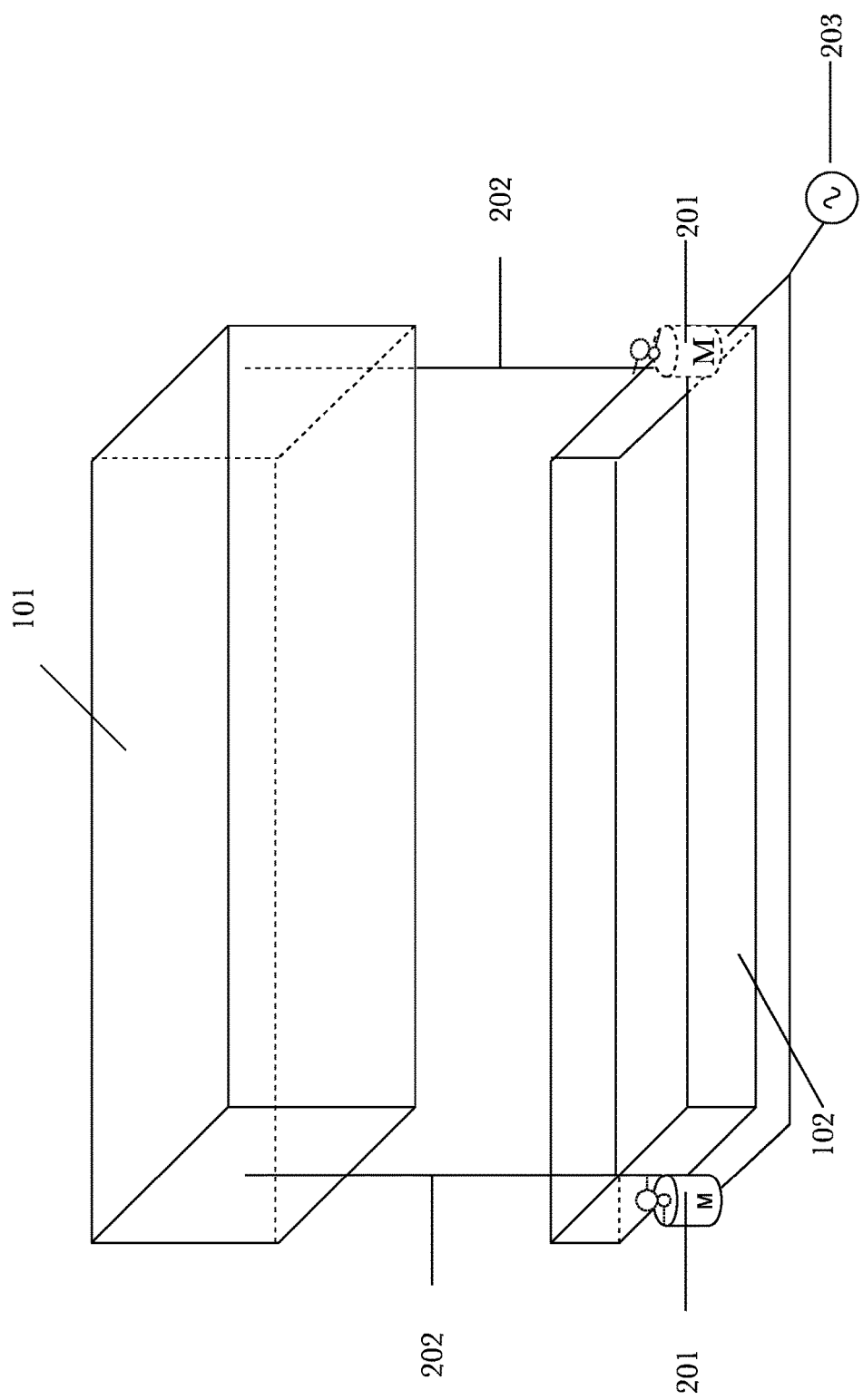
FIG. 2 is exemplary of an operating assembly used to open the growing unit in an embodiment using a vertical track straight up and down as viewed from the left front.

FIG. 2 is exemplary of an embodiment with an operating assembly (e.g., motor 201 and track 202, etc.) used to open the upper assembly 101 of the growing unit 100 straight up and down with respect to the lower assembly 102 in an embodiment using a vertical track 202 as viewed from the left front. In this embodiment, the operating assembly 201/202 is powered by a power source 203.

Figure 3:
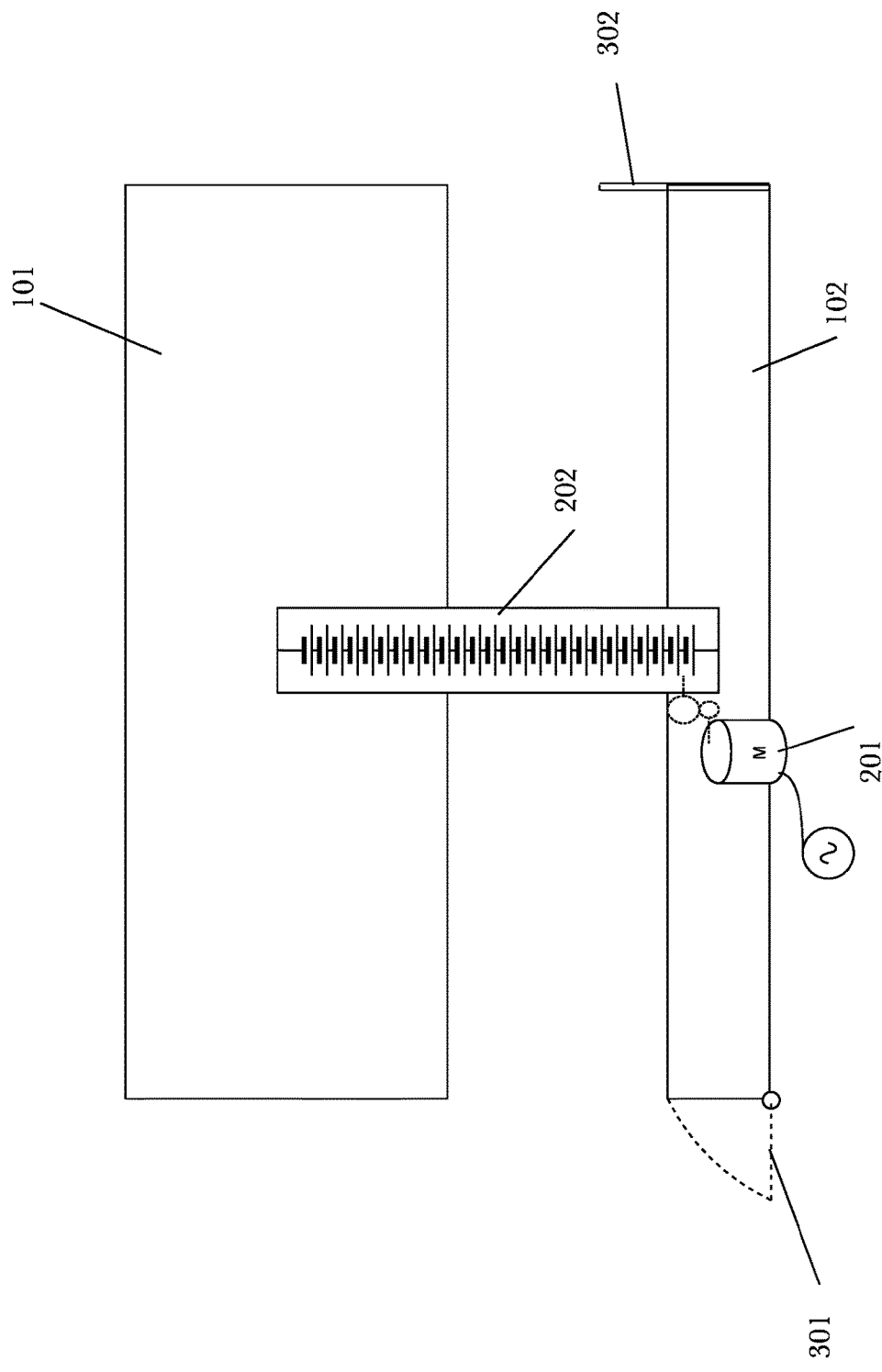
FIG. 3 is exemplary of a gear track assembly used to open and close the growing unit in an embodiment using a straight track as viewed from the right side showing a plant extrusion system in an operating position.

FIG. 3 is exemplary of an operating assembly 201/202 used to open and close the growing unit upper assembly 101 with the lower assembly 102 remaining fixed in an embodiment using a straight track 301 as viewed from the right side showing a plant extrusion system 302 and a hinged plant exit wall 301 in an operating position. The plant extrusion system 302 rests against the rear wall of the growing unit 100 until called upon to move by the operating assembly 201/202 at which time it moves the plants toward the front of the lower assembly unit 102. Simultaneously, the hinged plant exit wall 301 pivots down to a point even with the bottom of the lower assembly unit 102. The signal for the operating assembly to begin operating is provided by the electronically controlled source 1104 indicated in FIG. 11. As the plants exit the growing unit 100, they are received by any one of a number of conveying apparatuses (conveyor belts, roller systems, palletized stacking systems, etc.) that have been aligned to the growing unit exit wall. For example, when an automated monitoring system (as described in FIG. 12) detects a plant is ready for harvest, the automated monitoring system will send an electronic signal to open the growing unit 100 enough to clear the height of the crop and subsequently exit the crop onto a conveying apparatus. The growing unit 100 will then automatically begin a new crop cycle based on instructions from the automated monitoring system.

Figure 4:
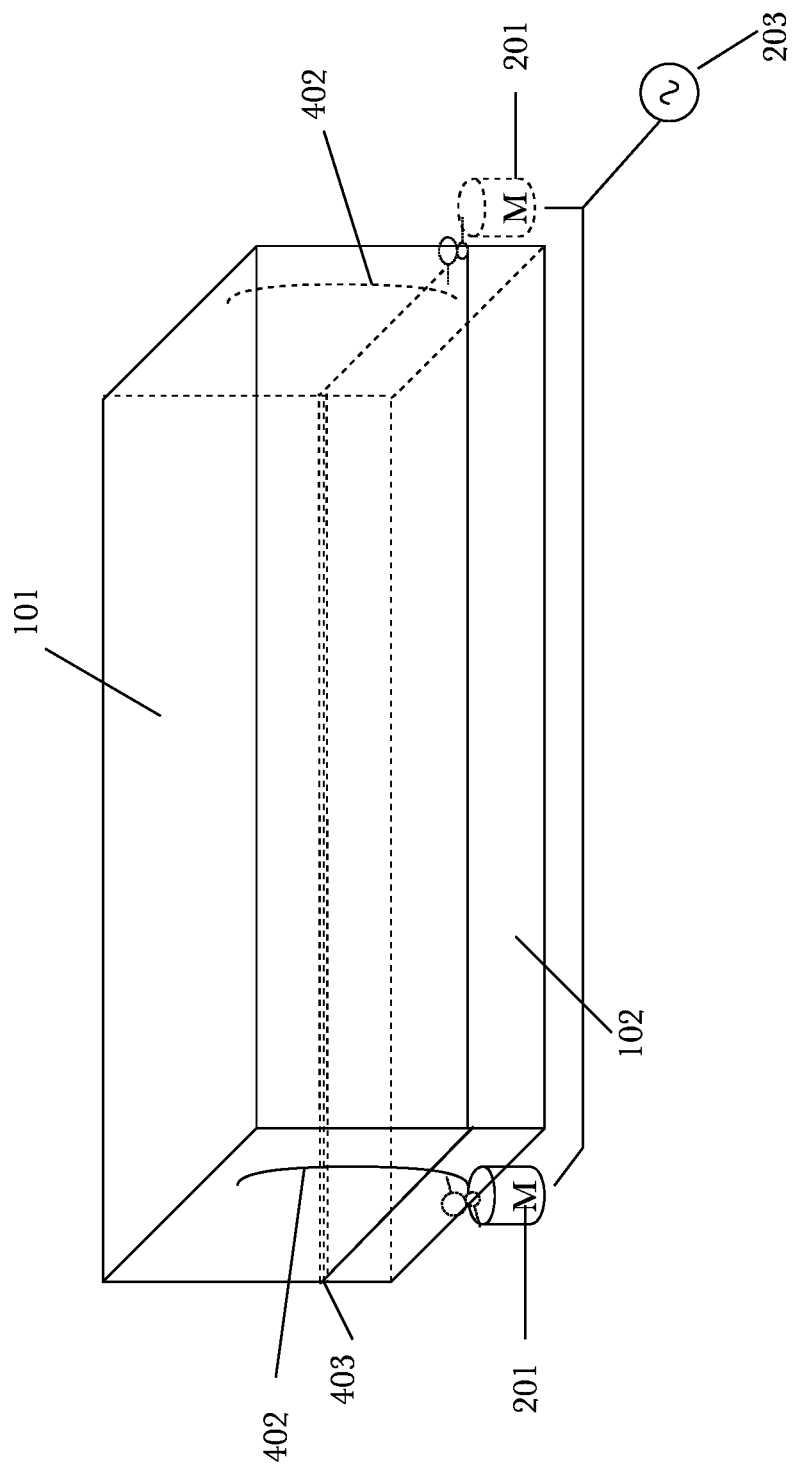
FIG. 4 is exemplary of a general location of an operating assembly, including a curved gear track, motors, and a source of power used to open a growing unit at an angle pivoting around a hinge at the rear of the unit as viewed from the left front.

FIG. 4 is an embodiment exemplary of a general location of an operating assembly 201 and a source of power 203 used to open an upper assembly 101 of a growing unit at an angle pivoting around a hinge 403 at the rear of the growing unit 100 as viewed from the left front. The lower assembly 102 of the growing unit remains fixed with respect to the upper assembly 101. As indicated in this exemplary embodiment, the operating assembly 201 uses a curved track 402 to affect the opening of the upper assembly 101 at an angle with respect to the lower assembly 102 using the hinge 403 at the rear of the growing unit 100.

Figure 5:
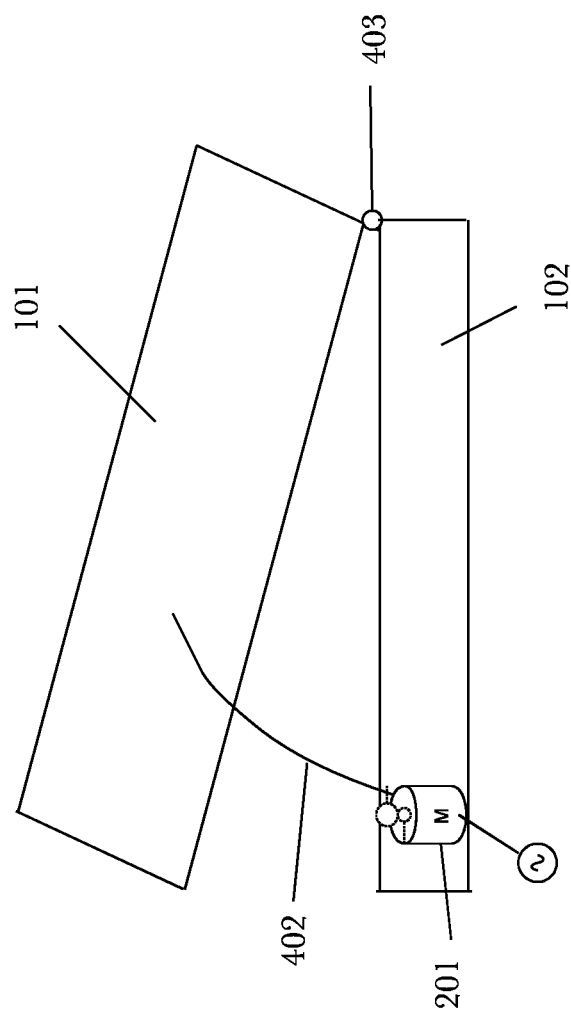
FIG. 5 is exemplary of an operating assembly used to open a growing unit in an embodiment using a curved gear track to open from the front using a rear hinge as viewed from the right side.

FIG. 5 is exemplary of an embodiment as viewed from the right side using an operating assembly 201/402 to open a growing unit 100 at an angle using a curved track 402 to open the upper assembly 101 from the front with the lower assembly 102 which remains fixed as the upper assembly 101 pivots around a rear hinge 403

Figure 6:
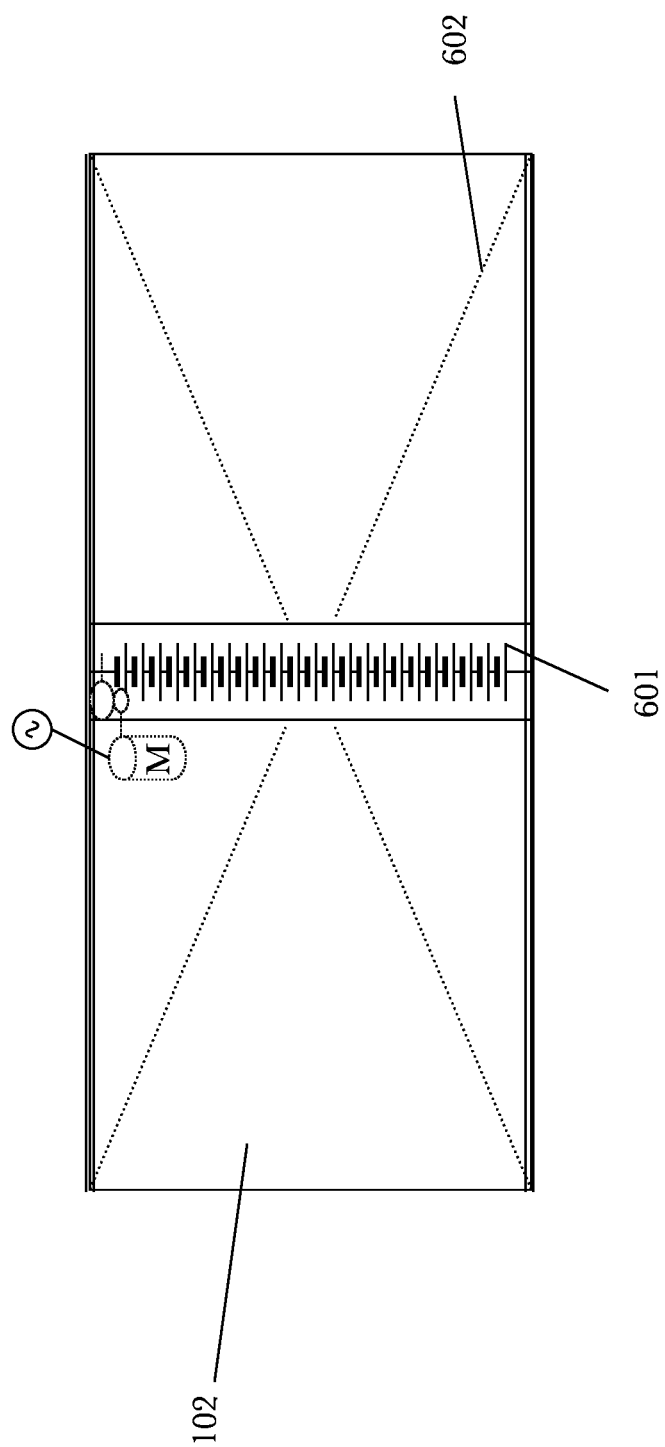
FIG. 6 is an embodiment of the rear vertical wall and plant extrusion assembly in the closed position on a growing unit as seen from above.

FIG. 6 is an embodiment of the fixed rear vertical wall of lower assembly 102 and plant extrusion assembly 601 in its closed position on a growing unit 100 as seen from above. Also, the hinged plant exit wall is indicated in its closed position. The formed channels 602 (shown as an X with dotted lines) in the lower assembly in this exemplary embodiment is a type of excess water control.

Figure 7:
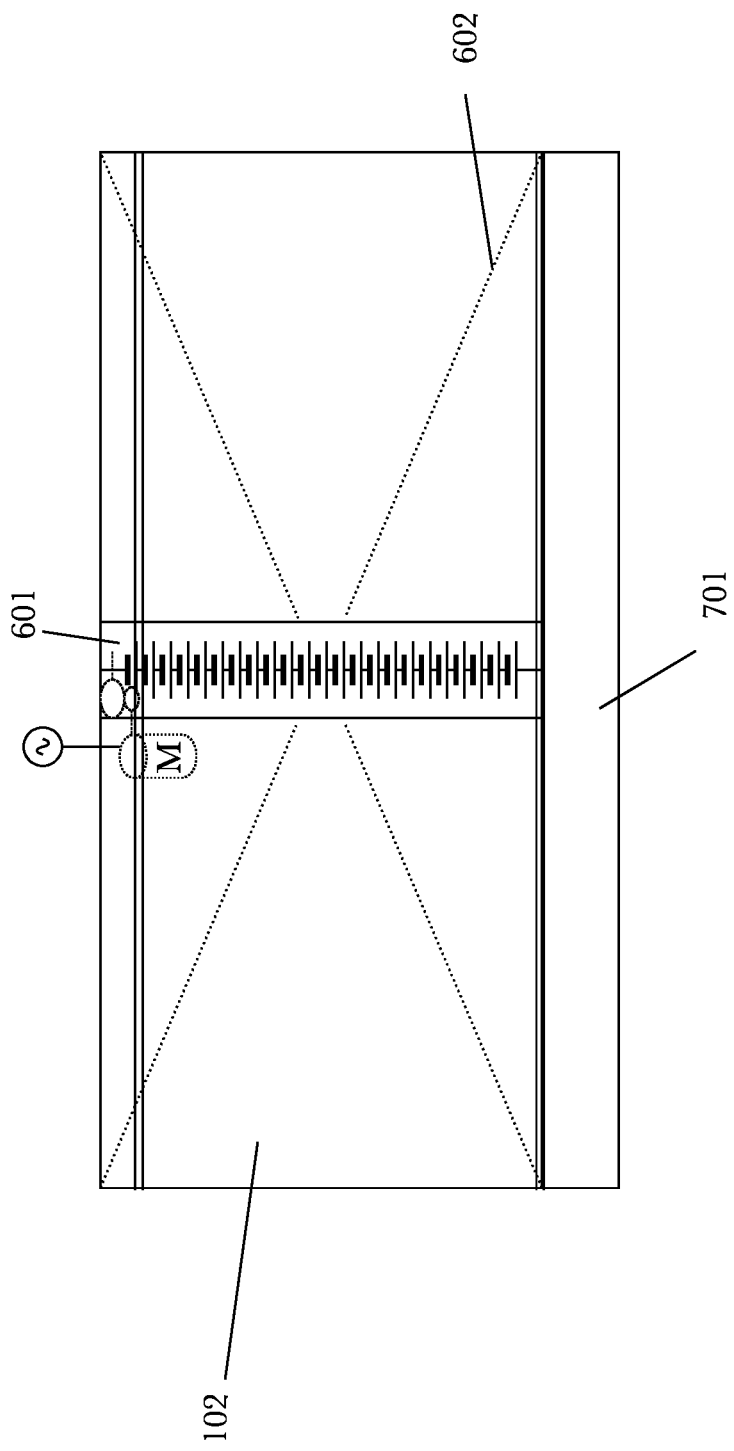
FIG. 7 is an embodiment of the rear part of a plant extrusion assembly and the forward part of a plant discharge assembly of the growing unit in the operating position observed from above.

FIG. 7 is exemplary of an embodiment of a plant extrusion assembly 601 and a hinged plant exit wall 701 in an operating position within a growing unit 100 as observed from above. An operating assembly and a horizontal track 602 using a signal from electronically controlled source is used to trigger the locomotion in an embodiment of a plant extrusion assembly 601 while, at the same time, the exemplary electronically controlled source could trigger the lowering of the hinged plant exit wall assembly.

Figure 8:
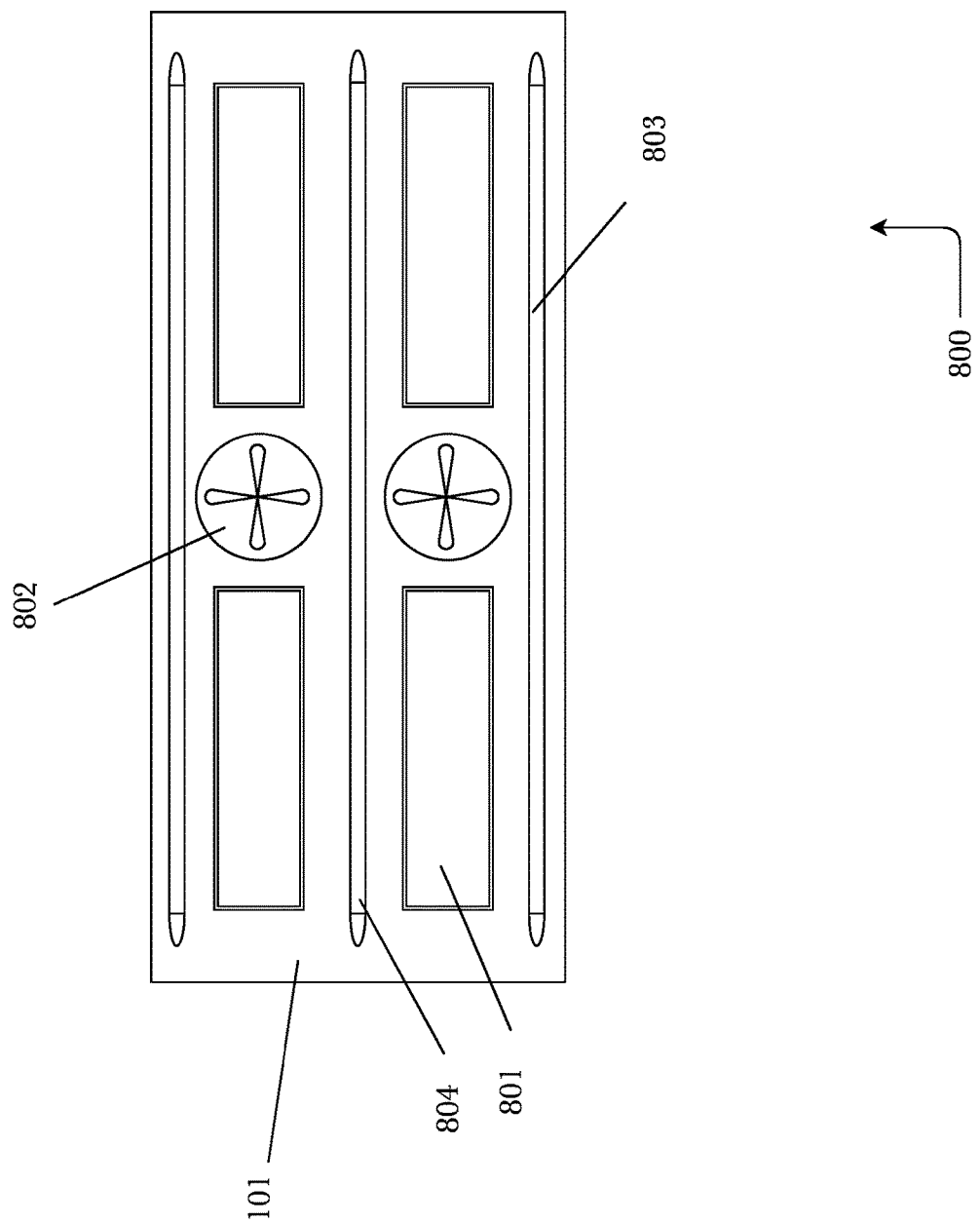
FIG. 8 is exemplary of an embodiment of the interior upper assembly from the bottom looking up at lighting, air supply, and water lines.

FIG. 8 is exemplary of an embodiment of an interior upper utility assembly 800 contained with an upper assembly 101 observed from the bottom looking up. Exemplary utilities may include lighting 801, an external air vent 802, and water and nutrient lines 803. The lighting 801 array can be positioned within this exemplary embodiment to provide maintenance and growth lighting within the growing unit 100. The external air vent 802 is exemplary of an embodiment providing necessary air change along with some temperature control in the growing unit 100. Water and nutrient lines 803 in this embodiment provide a nutrient rich fluid distributed evenly throughout the growing unit 100. The exemplary utilities in this embodiment may receive their signals to operate from the electronically controlled source.

Figure 9:
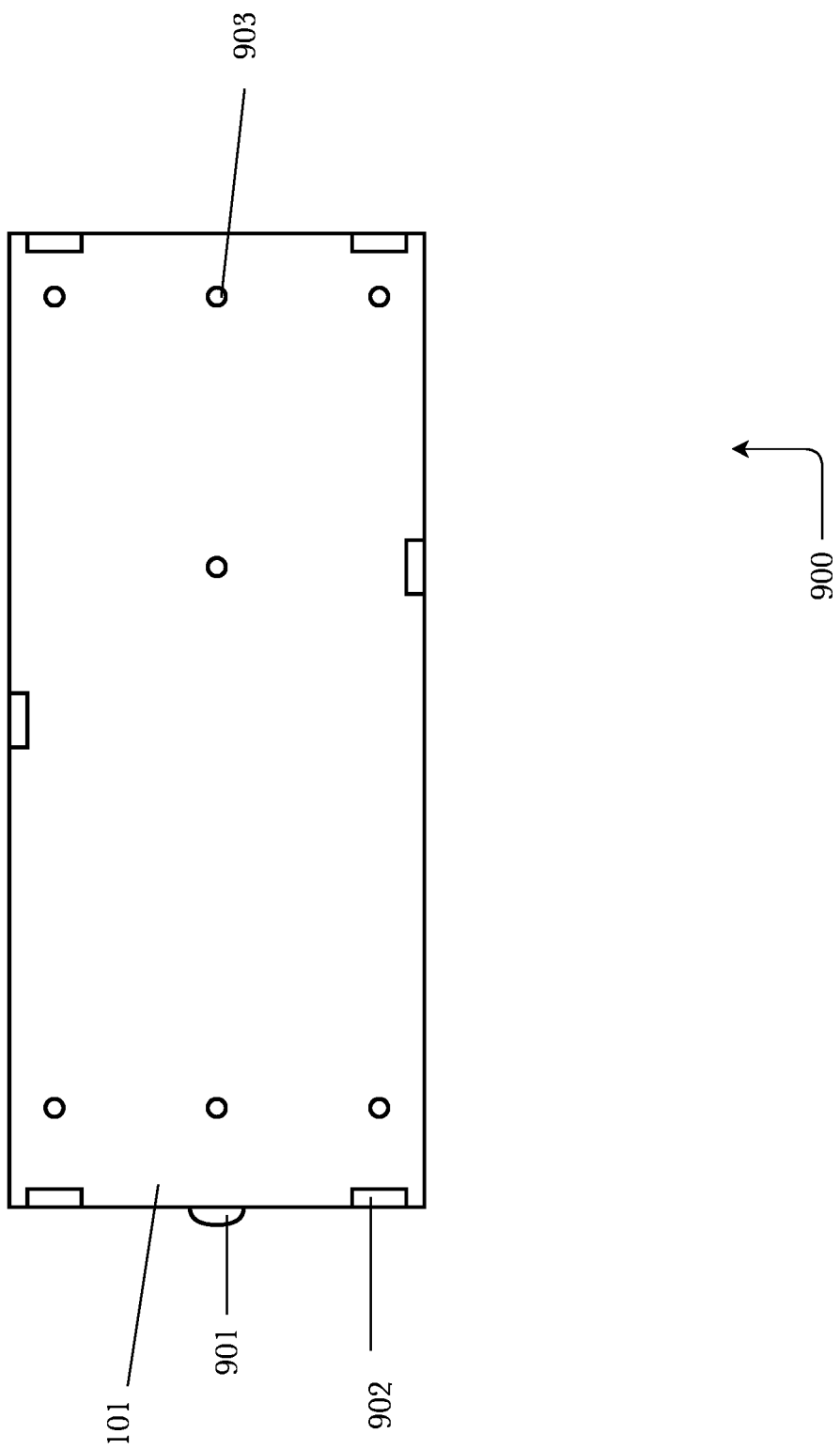
FIG. 9 is exemplary of an embodiment of the interior the upper assembly from the bottom looking up in an alternate view to clearly indicate an arrangement of sensors in the upper assembly of a growing unit

FIG. 9 is exemplary of an embodiment of an interior 900 view from the bottom of an upper assembly 101. The omission of exemplary utilities 801-803 shown in FIG. 8 was done to clearly indicate an exemplary arrangement of sensors in the upper assembly 101 of a growing unit 100. The circles indicate moisture sensors 903 shown in an embodiment in which they extend from the upper assembly 101 downward into the rooting substrate within the lower assembly 102 of the growing unit 100. In other embodiments moisture sensors may be built into the lower assembly 102. Sensor nodes 902 shown as rectangles around the inside edge of the upper assembly 102 are an aspect that may cover sensors to monitor $CO_2$, temperature, humidity, and other exemplary environmental conditions as needed in the growing unit 100. The semi-circular node 901 is connected to the external air vent 804. The exemplary sensor nodes 902 and the exemplary moisture sensors 903 in this embodiment receive their signals to operate from the electronically controlled source.

Figure 10:
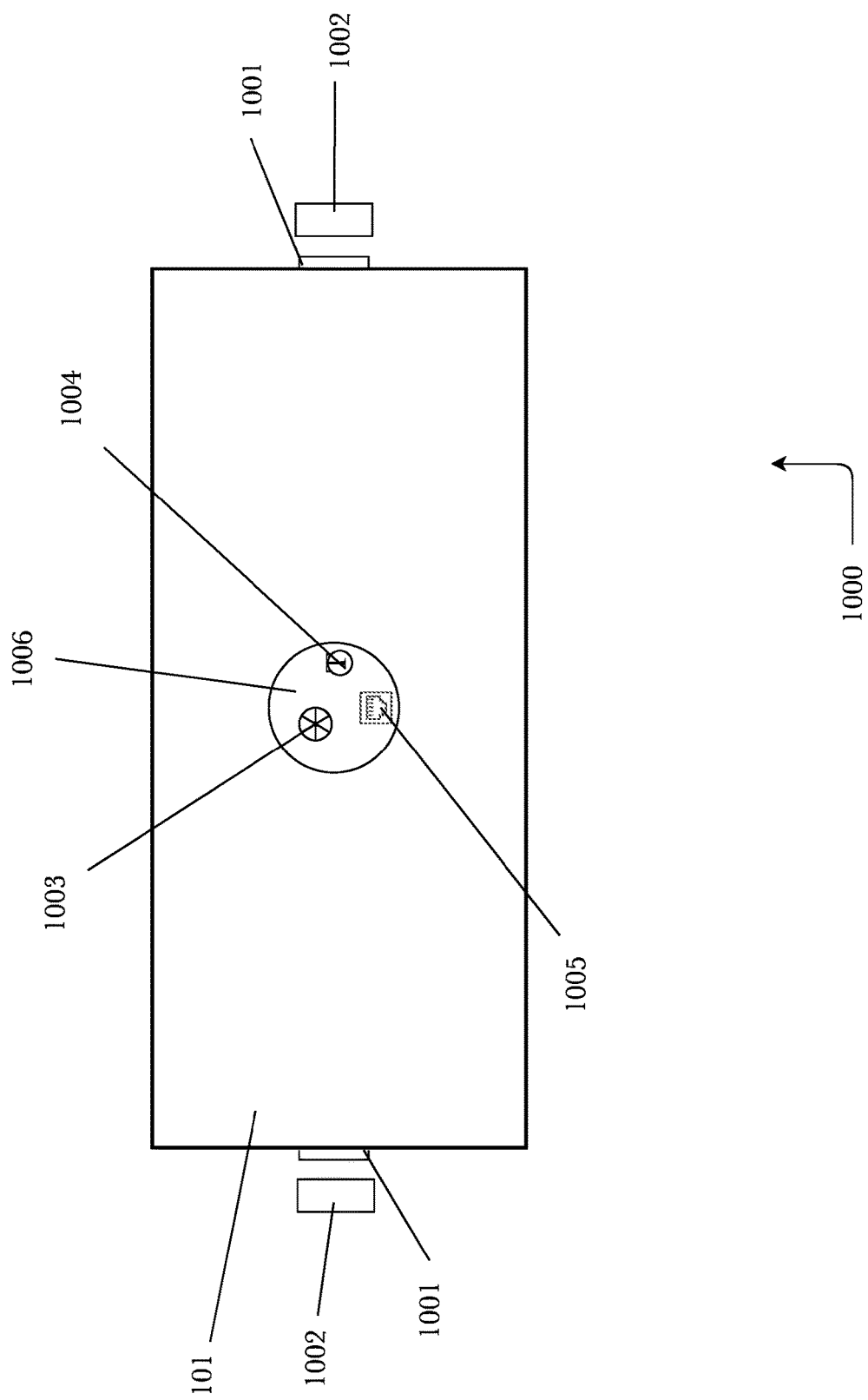
FIG. 10 is an embodiment exemplary of the support connections assembly structure as seen from outside and above a growing unit.

FIG. 10 is an embodiment exemplary of a support connections assembly 1000 as seen from outside and above a growing unit 100. In this embodiment are exemplary utilities and communications connection such as, a power terminal 1004, an internet/communications port 1005, and a water/nutrient connection point 1003. All connections are made through the hollow interior of vertical supports 1002 for the vertical stacking growing units 100 as further described in the exemplary embodiment of FIG. 11. A vertical track assembly 1001 is shown connected to the growing unit 100 to raise the upper assembly 101 when needed.

Figure 11:
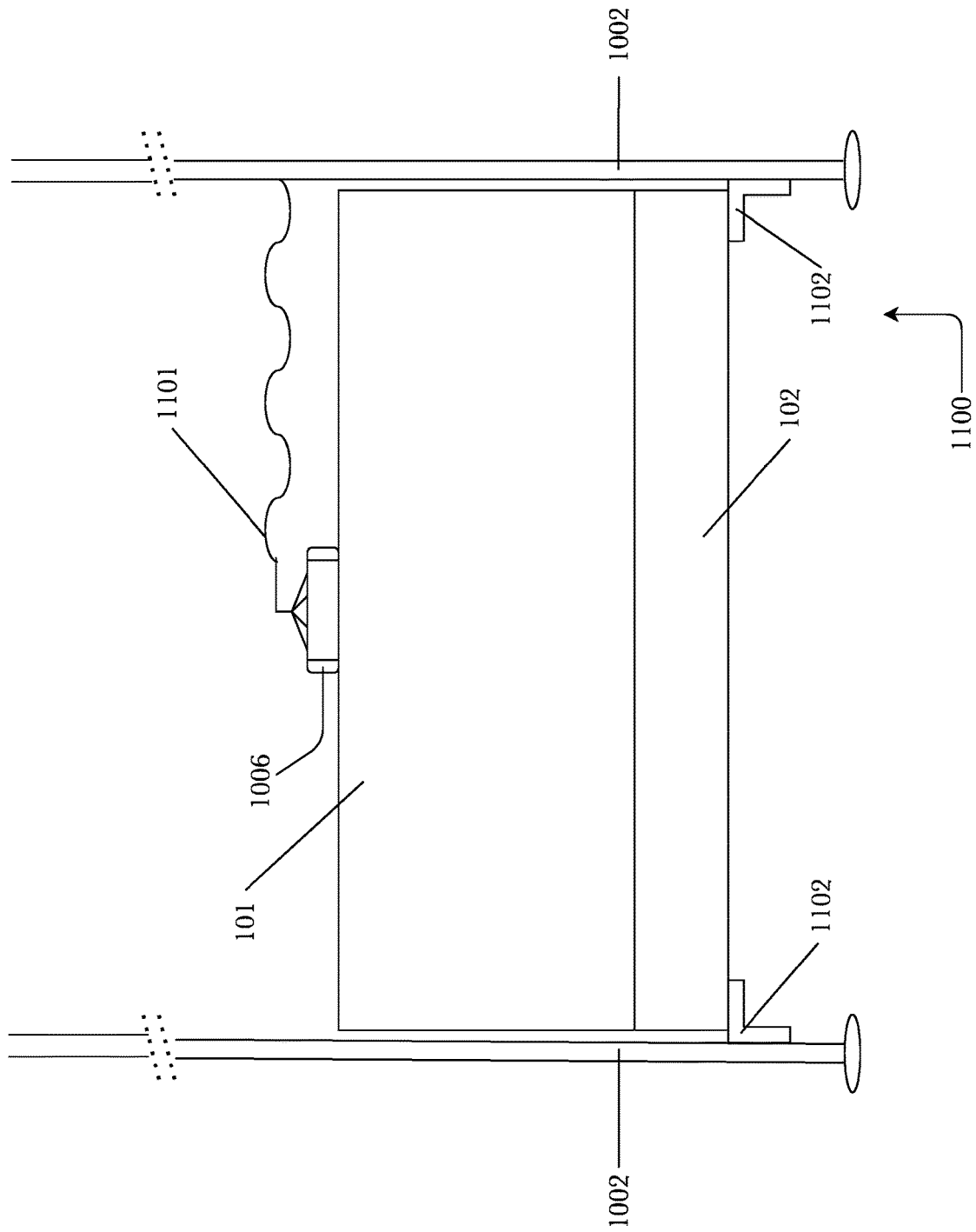
FIG. 11 is exemplary of an embodiment of the growing unit from the front while mounted within an expandable vertical stacking shelf structure.

FIG. 11 is exemplary of an embodiment of the growing unit 100 from the front mounted within an expandable vertical stacking shelf structure 1100. The vertical supports 1002 may be fastened to the growing facility floor for structural support. A growing unit 100 in this embodiment sits upon angled seats 1102 connected to both the growing unit 100 and the vertical supports 1002. In this embodiment, an exemplary support connections assembly 1006 is shown on the top of the upper assembly 101 or the growing unit 100 and connected to the utilities 1101. The vertical supports 1002 are showed with a dashed line break indicating the vertical stack-ability of an embodiment of this exemplary growing unit 100.

Figure 12:
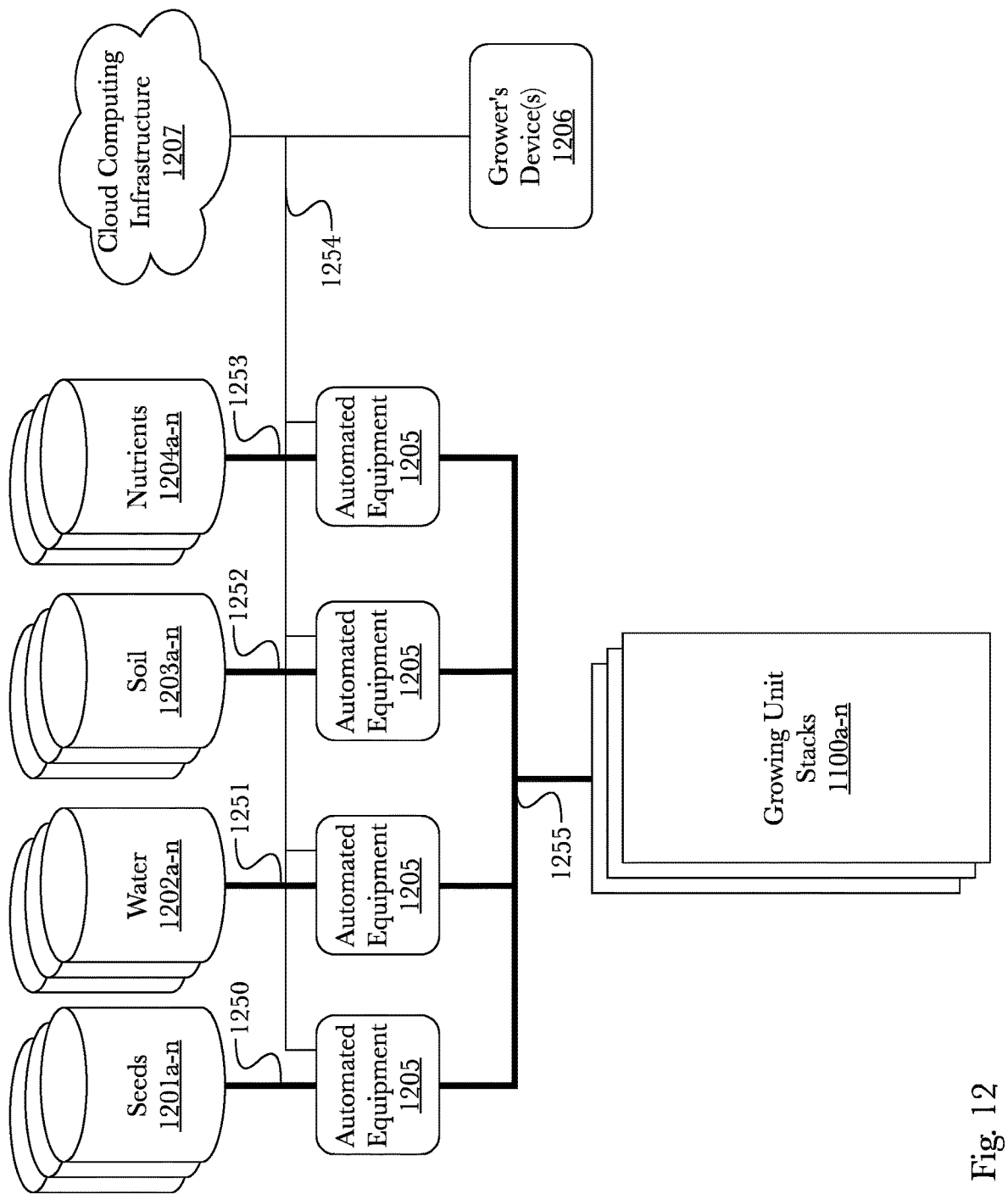
FIG. 12 is a block diagram illustrating one implementation of growing units within a automated environment, according to one embodiment.

FIG. 12 is a block diagram illustrating one implementation of growing units within an automated environment, according to one embodiment. This embodiment shows an exemplary scenario in which one or more growing units 100 are arranged in vertical stacks 1100a-n and connected 1255 to a plurality of automation equipment 1205 which serves (1250-1253) resources (1201a-n, 1202a-n, 1203a-n, 1204a-n) to each growing unit 100 individually by receiving commands 1254 from a grower's device 1206 or via a cloud computing infrastructure such as a mobile app utilizing distributed computing.

One utility of the claimed invention is the scalability of the growing operation. Resources (1201a-n, 1202a-n, 1203a-n, 1204a-n) may be large industrial vats for large operations or single gallon jugs for personal use and everything in-between. Resources like water 1202a-n may be connected to city water connections and the like. The vertical structures likewise have only limitations on height based on the materials and engineering of the structures. Water pumps (inferred in automated equipment 1205) should be chosen based on the highest growing unit.

Automated equipment may comprise mechanical, analog, or digital means of measuring resources as well as pumps, tubes, conveyor belts, and other equipment needed as applicable to the scale of the growing operation. Nutrients 1204a-n refers to any chemical needed by any of the seeds 1201a-n. Additionally, growing medium delivered or otherwise placed in a growing unit refers to soil, nutrients, seeds, or any other physical media used in the growing of crops.

Growing units 100 may have dispensing valves or other actuating apparatus needed to distribute resources properly. Cameras may be installed in growing units such that computer vision may be used by a computer system which controls the automation aspect of the growing process. Growing units may comprise walls which are hollow that comprise inner walls that expand with the movement of the upper 101 and/or lower assembly 102. Inner walls may be a series of parallel walls where the top portion of one inner wall is connected to the upper assembly 101 and upon reaching a specific height during the upwards movement of the upper assembly 101, an extruded portion of the first inner wall catches an extrusion on a second inner wall, pulling the second inner wall following the first inner wall, and so forth. Inner walls may be a flexible-folded wall that unfold as the growing unit changes dimensions. It is anticipated that growing units may be designed to expand in all relative spatial dimensions (X, Y, and Z) and that inner walls maintain the integrity of the growing unit's environment.

A computer system regulates the environment (air, light, water, soil, nutrients, temperature, etc.) of each growing unit per a crop profile. The crop profile may also be adjusted by machine learning models. The computer system may generate reports or notifications if the crop is performing well or if the there are issues with the crop or growing unit. The computer implemented automation aspect may reside in a local server within the grow operation, a distributed computing platform such as a cloud computing infrastructure, microcontrollers, personal computing devices, and other such computing platforms. Commanding the computer system may take place on the computing system itself or via a mobile device such as a smart phone or tablet. In such a scenario, grower's devices 1206 may be enabled to download a mobile application to control the growing units directly or via a cloud computing platform 1207.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
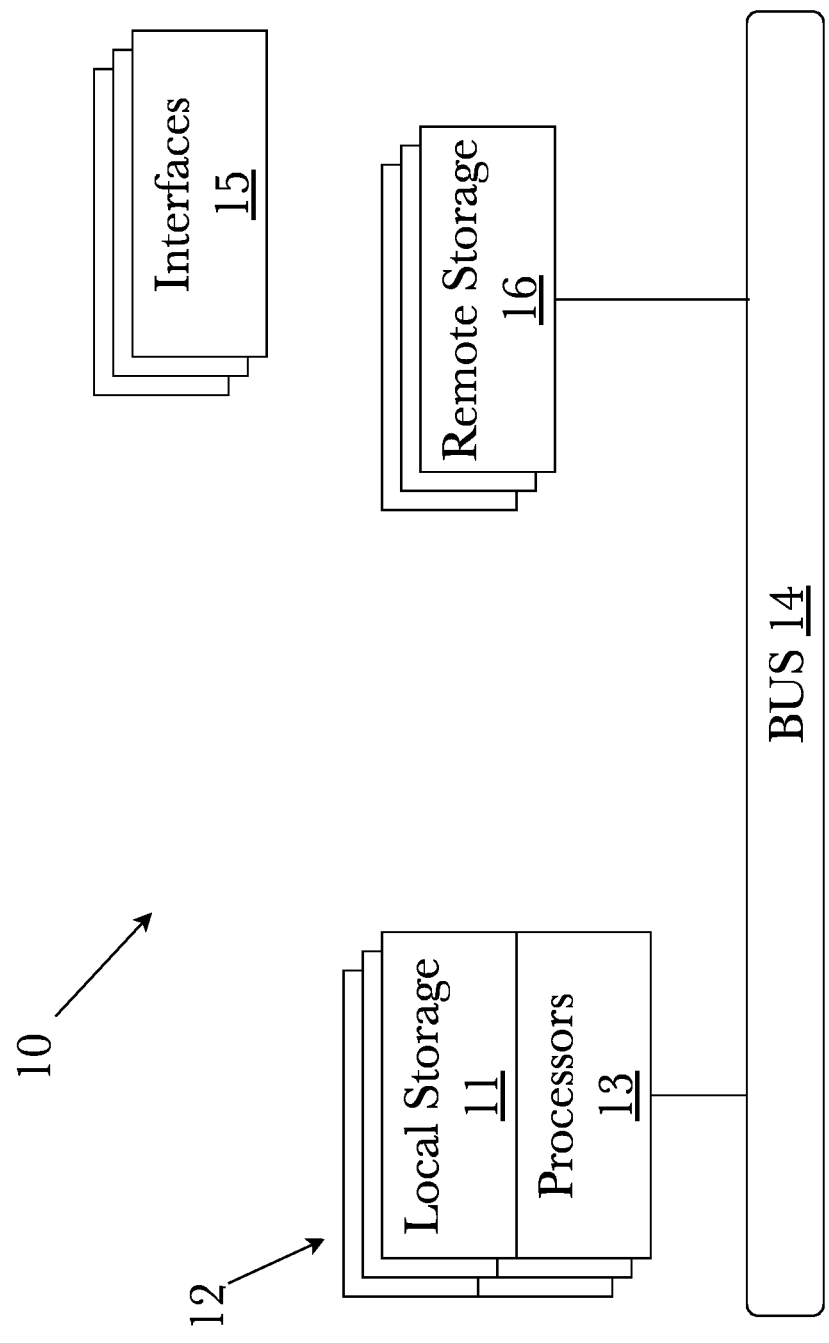
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
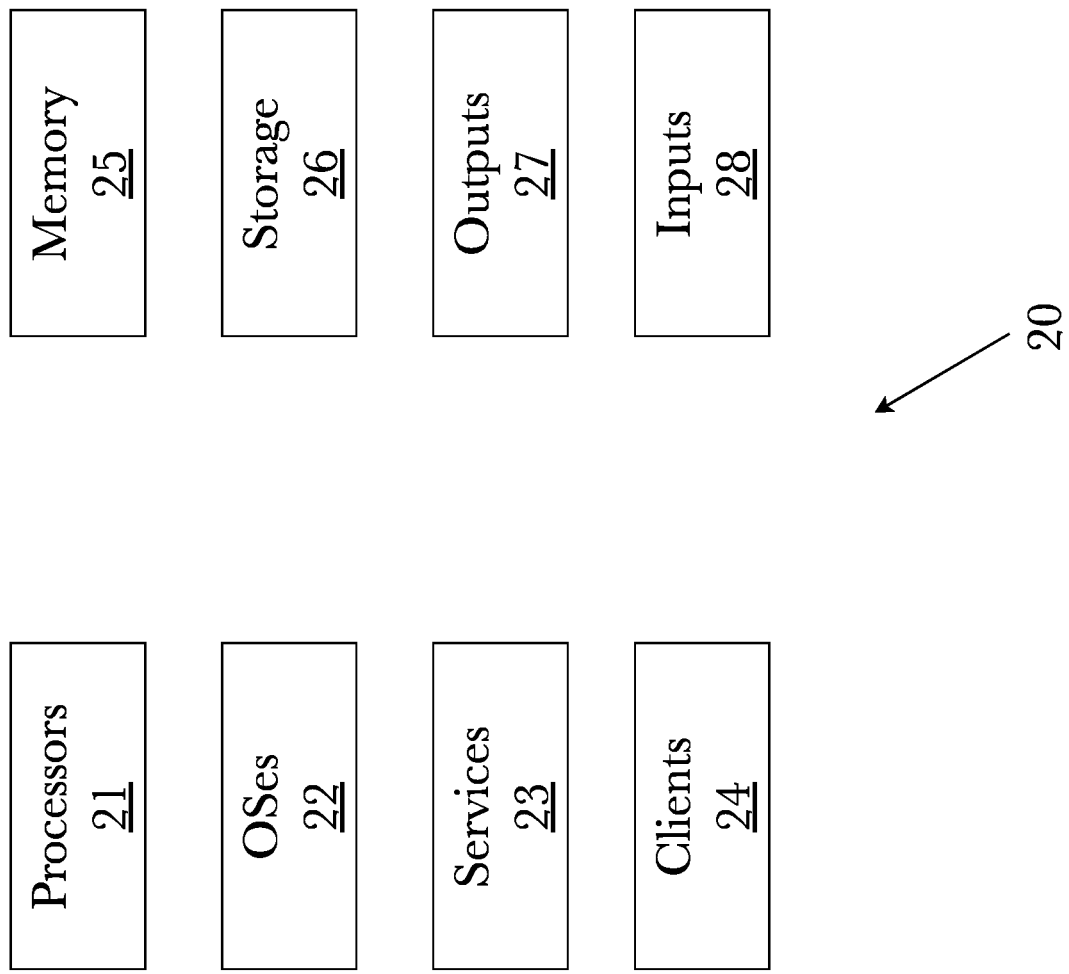
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system.

Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
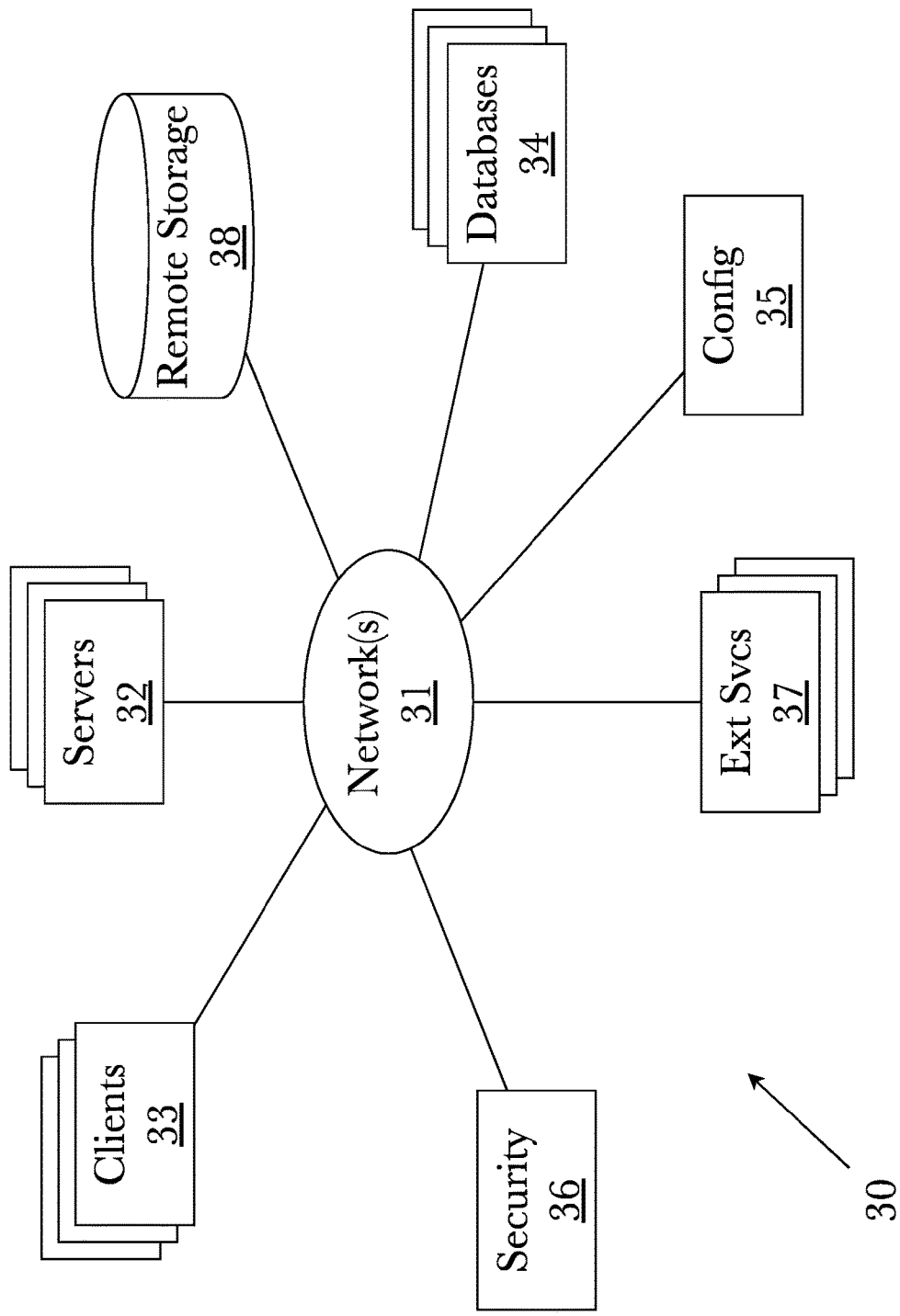
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 16:
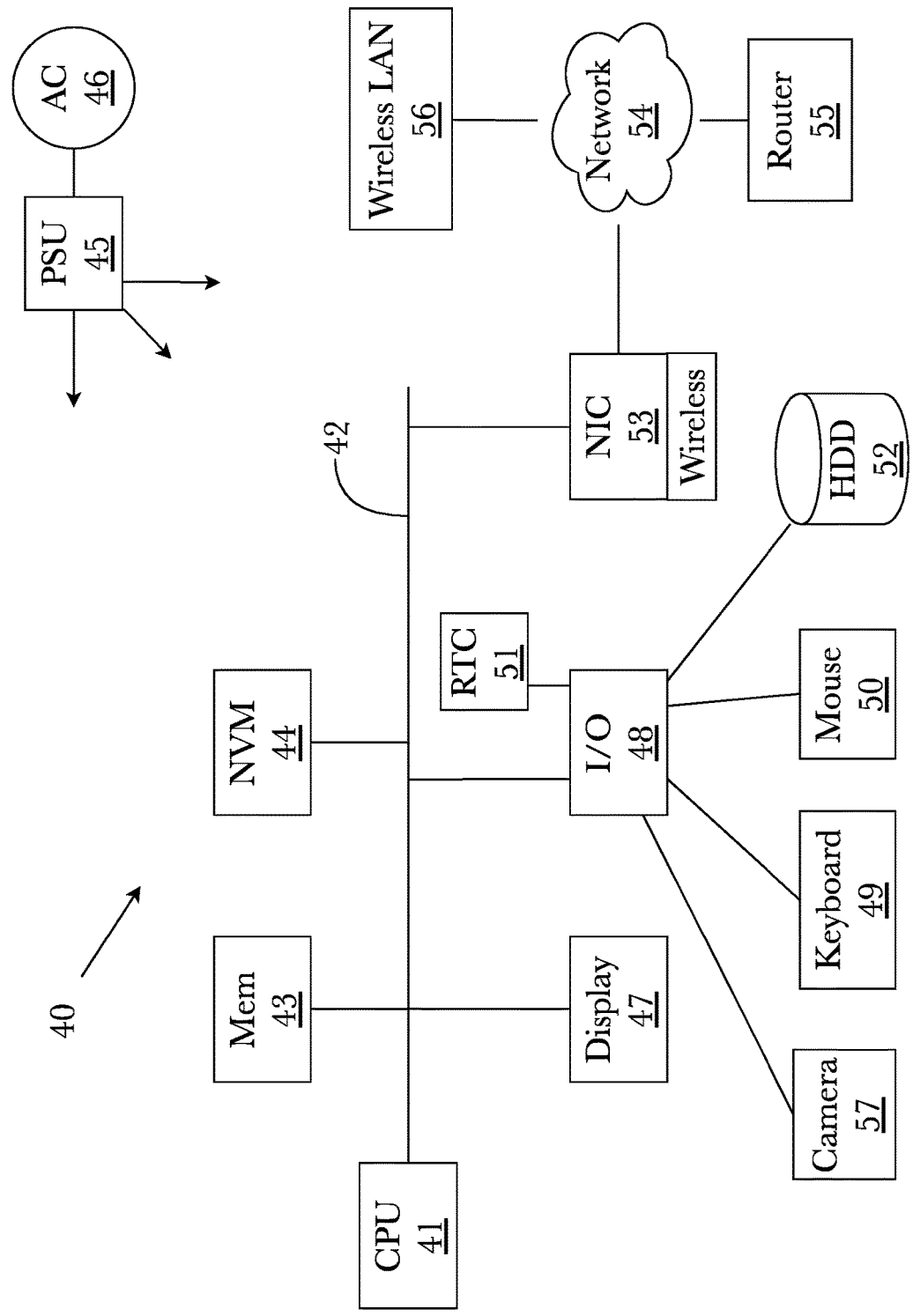
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 17:
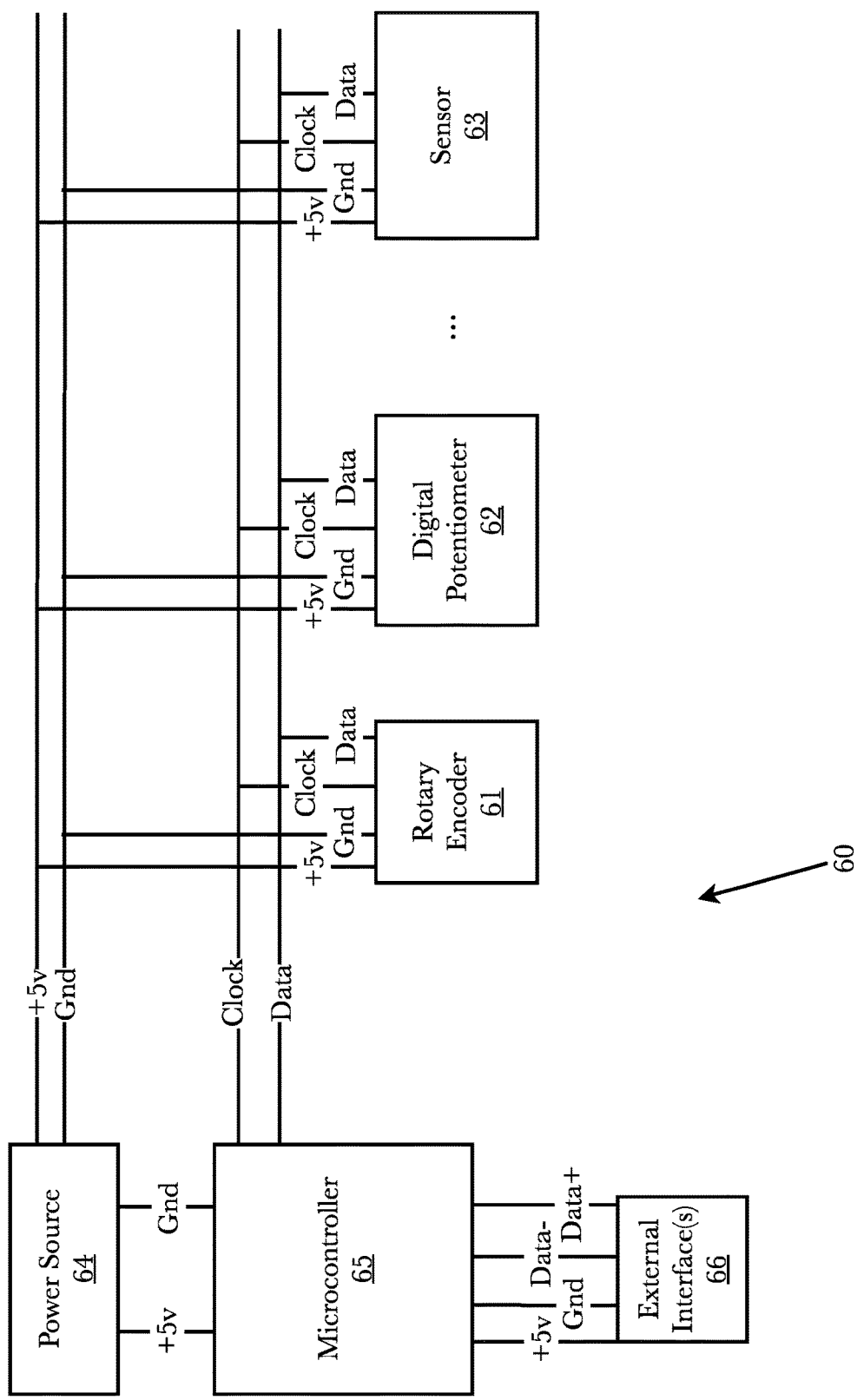
FIG. 17 is a block diagram illustrating an exemplary hardware architecture of a microcontroller device.

FIG. 17 is an exemplary system architecture diagram for a microcontroller 65 and an exemplary operating environment 60. The microcontroller 65 is a small computing device with one or more processors, a memory, communications controllers, and one or more inputs and outputs. Microcontrollers in this type of application are typically pre-programmed for the intended use. The microcontroller 65 may have onboard power and may also be supplemented by an external power source 64. The microcontroller 65 is used to receive input signals either from sensors 63 or other computing devices, such as receiving signals from a rotary encoder 61. A microcontroller 65 contains an inter-integrated circuit bus (also known as I2C) which allows for fully addressable serial communication with slave devices such as rotary encoders 61, digital potentiometers 62, or sensors 63 using common wires for +5 v and ground (for power), a clock signal, and data. While not required, external devices 61-63 may also contain a communications controller allowing for I2C serial communications with the microcontroller 65. As an example, the rotary encoder 61 outputs square-wave signals indicating rotation of the rotary encoder 61 shaft. The signals from the rotary encoder 61 are received by the microcontroller 65, which counts each change in the signal (typically from low to high, but the reverse is also possible). The degree of rotation of the rotary encoder 61 shaft for each signal change is determined by the resolution of the rotary encoder 61 (e.g., a 10-bit rotary encoder would have 1,024 changes per revolution, with each change representing 0.362 degrees). In addition to counting the number of changes, the micro-controller can use timers to determine the frequency of changes (corresponding to the angular velocity of the rotary encoder 61 shaft) and changes in the frequency (corresponding to acceleration or deceleration of the rotary encoder 61 shaft). Likewise, each digital potentiometer 62 also contains an I2C controller, allowing the digital potentiometers 62 to be individually addressed as slave devices by the microcontroller 65, and their resistances to be adjusted individually, which changes the resistance across the leads of each motor and thus the resistance force provided by each motor.

Although the previous example uses the I2C serial communications protocol, any addressable communication protocol may be used, including serial and parallel communications protocols, such as serial to peripheral interface (SPI), universal asynchronous receiver-transmitter (UART), etc. In some embodiments, direct pinouts from the microcontroller may be used instead of addressable communications protocols. In some embodiments, wireless communications between the microcontroller 65 and the rotary encoder 61 may be used instead of wired communications.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated and modular controlled-environment agriculture units, comprising:
a growing unit communicatively coupled to a network;
wherein the growing unit comprises a fixed lower assembly coupled to an upper assembly via a first motorized track;
the lower assembly comprising a second motorized track along the bottom and a hinged door along the one side of the lower assembly;
the upper assembly comprising one or more lights, an air vent, a water line, and one or more nutrient lines; and
the upper assembly further comprising one or more carbon dioxide ($CO_2$), temperature, and humidity sensors;
a supply of a plurality of resources;
a plurality of automation equipment, wherein the plurality of automation equipment measures and delivers a supply of water, seeds, nutrients, and soil to the growing unit; and
a computer system comprising a memory and a processor operating on the network, wherein a plurality of programming instructions stored in the memory and operating on the processor, causes the computer system to:
receive an instruction to begin growing a specific crop;
identify the specifications needed to facilitate the specific crop, wherein the specifications are stored in a crop profile and comprise a spatial and nutrient profile of the specific crop;
identify a next available growing unit for the specific crop;
send a signal to the plurality of automation equipment to measure and deliver the proper amount of growing medium and water to the growing unit via the water line, and one or more nutrient lines;
monitor the environmental levels within the growing unit via the one or more sensors;
adjust the height of the upper assembly via the first motorized track based on the crop profile;
adjust the environment within the growing unit based on the crop profile and the monitored levels; and
activate the second motorized track and the hinged door of the lower assembly to expel the specific crop from the growing unit upon detection of crop maturity or based on the crop profile.

2. The system of claim 1, wherein the growing unit expands horizontally and vertically to accommodate the growth of the specific crop.

3. The system of claim 1, wherein the outer growing unit walls are hollow and comprise inner walls that keep the growing unit self-contained when expanded.

4. The system of claim 1, wherein the computer system comprises machine learning models to determine the best growing environment for the specific crop within a growing unit.

5. The system of claim 4, wherein the machine learning models update the crop profile.

6. The system of claim 4, wherein the machine learning models use computer vision to monitor crop progression.

* * * * *